United States Patent
Tetrault

(10) Patent No.: US 9,575,171 B1
(45) Date of Patent: Feb. 21, 2017

(54) SINGLE ANTENNA ALTIMETER

(75) Inventor: Howard Tetrault, Melbourne, FL (US)

(73) Assignee: Rockwell Collins, Inc., Cedar Rapids, IA (US)

(*) Notice: Subject to any disclaimer, the term of this patent is extended or adjusted under 35 U.S.C. 154(b) by 668 days.

(21) Appl. No.: 13/359,655

(22) Filed: Jan. 27, 2012

(51) Int. Cl.
*G01S 13/08* (2006.01)
*G01S 13/88* (2006.01)
*G01S 13/46* (2006.01)

(52) U.S. Cl.
CPC ............ *G01S 13/882* (2013.01); *G01S 13/46* (2013.01)

(58) Field of Classification Search
CPC .................................................. G01S 13/882
USPC .................................................. 342/120–122
See application file for complete search history.

(56) References Cited

U.S. PATENT DOCUMENTS

| | | | | |
|---|---|---|---|---|
| 4,958,161 A * | 9/1990 | Allezard | ............... | G01S 13/343 342/120 |
| 6,094,158 A * | 7/2000 | Williams | ............... | A61H 3/061 342/157 |
| 6,768,469 B2 * | 7/2004 | Hager | ...................... | G01S 7/03 343/708 |
| 6,897,832 B2 * | 5/2005 | Essig, Jr. | ................ | E04H 15/20 342/10 |
| 7,969,350 B2 * | 6/2011 | Winstead | .............. | G01S 13/882 342/121 |
| 8,674,899 B2 * | 3/2014 | Ando | ...................... | G01S 7/032 343/702 |
| 2009/0274072 A1 * | 11/2009 | Knox | ................... | H01Q 1/2225 370/278 |
| 2009/0289834 A1 * | 11/2009 | Devensky | .............. | G01S 13/34 342/122 |
| 2010/0271253 A1 * | 10/2010 | Shah | ........................ | H01B 1/18 342/2 |
| 2010/0328073 A1 * | 12/2010 | Nikitin | .................. | G01S 5/0247 340/572.1 |

OTHER PUBLICATIONS

Vidmar, Matjaz, "A Landing Radio Altimeter for Small Aircraft", 13 pages; printed from internet at http://lea.hamradio.si/~s53mv/radalt/radalt.html; Jan. 18, 2012.

* cited by examiner

*Primary Examiner* — Marcus Windrich
(74) *Attorney, Agent, or Firm* — Angel N. Gerdzhikov; Donna P. Suchy; Daniel M. Barbieri

(57) ABSTRACT

A radio altimeter with at least one transmitting antenna and at least one receiving antenna in a single housing reduces coupling with antennae housings shaped to deflect electromagnetic signals, and spacing between the antennae based on the phase of the transmitting signal. Coupling of less than −40 dB is filtered by software using adaptive leakage cancelling.

16 Claims, 3 Drawing Sheets

SINGLE ANTENNA ALTIMETER

FIELD OF THE INVENTION

The present invention is directed generally toward phased radio antennae, and more particularly to radio altimeter systems.

BACKGROUND OF THE INVENTION

Frequency Modulated Continuous-wave (FMCW) radar is a short range measuring radar set. FMCW radar is often used as a "radar altimeter" to measure the exact distance between an aircraft and the ground during landing procedures. With the advent of modern electronics, the use of Digital Signal Processing (DSP) is used for most detection processing. The signals are passed through an Analog to Digital converter (ADC), and digital processing is performed on the result.

Current aircraft radio altimeter installation involves placing two separate antennae on the underside of the aircraft. Siting these antennae, including a transmitting antenna and a receiving antenna, is non-trivial. When the antennae are too far apart, low altitude performance is limited. When the antennae are too close together, the antennae suffer leakage due to poor isolation. Leakage may render the radio altimeter effectively useless if coupling between the antennae cannot be handled by software. Coupling is the transfer of energy from one circuit segment to another through some electrical process such as induction.

Consequently, it would be advantageous if an apparatus existed that is suitable for housing a receiving antenna and a transmitting antenna in close proximity, while limiting coupling between the antennae.

SUMMARY OF THE INVENTION

Accordingly, the present invention is directed to a novel method and apparatus for housing a receiving antenna and a transmitting antenna in close proximity, while limiting coupling between the antennae.

One embodiment of the present invention is a housing for a receiving antenna and transmitting antenna shaped to prevent coupling between the receiving antenna and transmitting antenna. The housing prevents coupling by deflecting electromagnetic signals that would otherwise transfer energy from one circuit segment to another.

In another embodiment of the present invention, the spacing between a receiving antenna and transmitting antenna in a housing, and the phase of electromagnetic signals in the system are configured to minimize coupling.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to the subject matter disclosed, which is illustrated in the accompanying drawings. The scope of the invention is limited only by the claims; numerous alternatives, modifications and equivalents are encompassed. For the purpose of clarity, technical material that is known in the technical fields related to the embodiments has not been described in detail to avoid unnecessarily obscuring the description.

Figure 1:
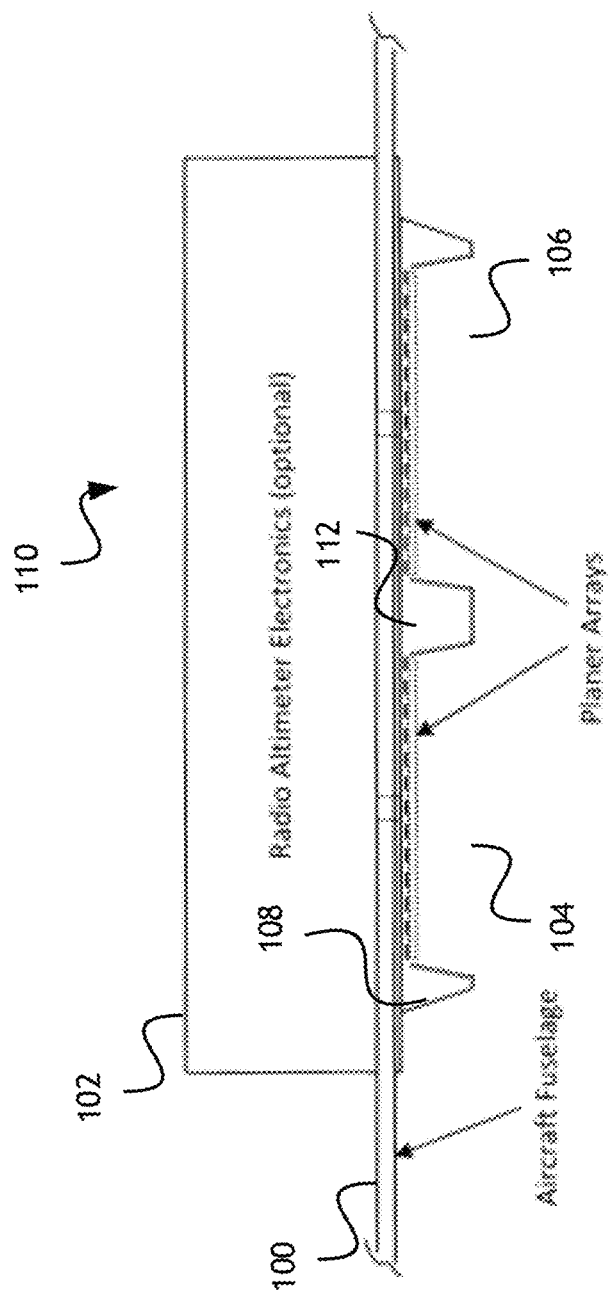
FIG. 1 shows a side view of an antennae array according to at least one embodiment of the present invention.

Referring to FIG. 1, a radio altimeter 110 according to the present invention is shown. The radio altimeter 110 may include at least one transmitting antenna 104 and at least one receiving antenna 106 surrounded by an antennae housing 108. The transmitting antenna 104 and receiving antenna 106 may be connected to altimeter electronics 102.

The transmitting antenna 104 may be configured as a planar array, and may be further configured to transmit a modulated signal at a known frequency and phase. The receiving antenna 106 may also be configured as a planar array, and may be further configured to receive a modulated signal, originating from the transmitting antenna 104, reflected off a surface such as the ground. The radio altimeter 110 may be installed in an aircraft fuselage 100.

The antennae housing 108 may include an antennae divider 112 separating the transmitting antenna 104 from the receiving antenna 106. The antennae divider 112 may be comprised of a radio opaque material to minimize signals from the transmitting antenna 104 reaching the receiving antenna 106 except by reflection off a surface. Furthermore, the antenna divider 112 may comprise a trapezoidal cross-section such that the surface defining the shorter of the parallel elements of the cross-section is distal to the antennae. Such shape may reflect signals originating from one antenna 104,106 away from the other antenna 104,106, and thereby reduce coupling. One skilled in the art will appreciate that other shapes may be effective to divergently reflect signals that may otherwise cause coupling in a radio altimeter. One skilled in the art will also appreciate that while the shape of the antennae divider 112 is specifically described, the shape of the entire antennae housing 108 may employ identical principals.

Figure 2:
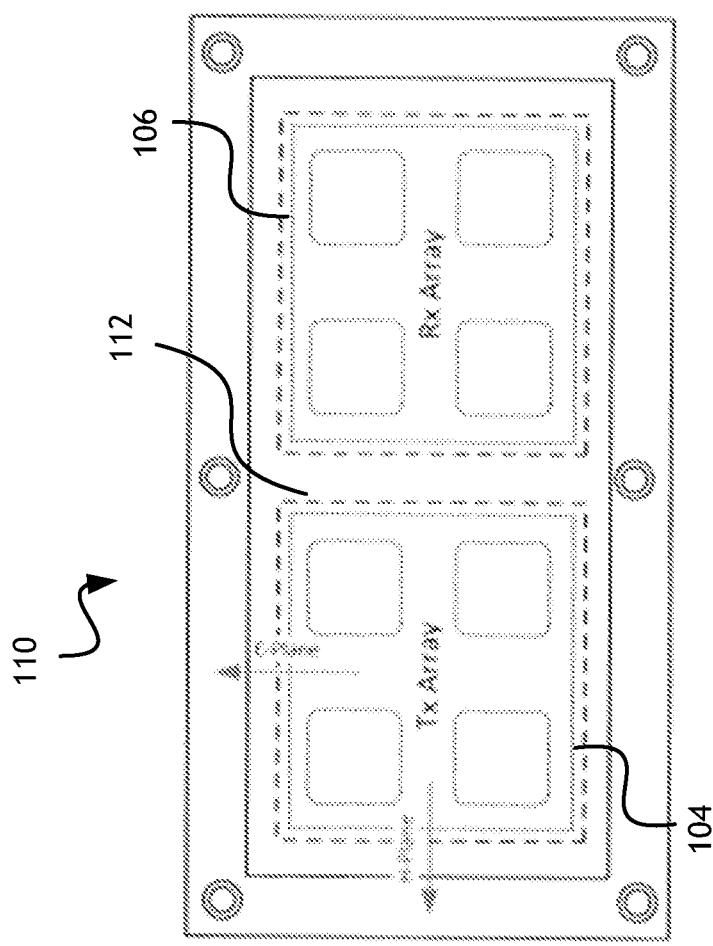
FIG. 2 shows a bottom view of the embodiment shown in FIG. 1.

Referring to FIG. 2, a bottom view of a radio altimeter 110 according to the present invention is shown. The radio altimeter 110 may comprise a transmitting antenna 104 and a receiving antenna 106 separated by some distance; that distance maybe defined by an antennae divider 112. Each of the transmitting antenna 104 and receiving antenna 106 may comprise a phased array having multiple array elements. A phased array is an array of antenna elements in which the relative phases of the respective signals feeding the antenna elements are varied in such a way that the effective radiation pattern of the array is reinforced in a desired direction and suppressed in undesired directions.

Coupling due to induction caused by signals from the transmitting antenna 104 may be distance dependent such that coupling increases significantly as the transmitting antenna 104 and receiving antenna 106 are positioned in close proximity. Coupling may be reduced by coordinating phases in the array elements of the transmitting antenna 104 and array elements of the receiving antenna 106 such that ancillary signals from the transmitting antenna 104 may be out-of-phase with the receiving antenna 106 and therefore produce only a limited inductive affect. Ancillary signals are those signals from the transmitting antenna 104 that are not directed toward a surface, such as the ground, where the radio altimeter is designed to measure the distance from the transmitting antenna 104 to the surface. Rather, ancillary signals are those signals from the transmitting antenna 104 that directly interfere with the receiving antenna 106. Spacing between the transmitting antenna 104 and receiving antenna 106 in a radio altimeter according to the present invention may be less than 32 inches.

One skilled in the art will appreciate that the phases of elements in a phased array such as the transmitting antenna 104 and receiving antenna 106 may be application dependent and especially dependent on the desired signal from the transmitting antenna 104. Furthermore, the distance between the transmitting antenna 104 and receiving antenna 106 in this application may be dependent on the power of any ancillary signals which itself may be dependent on the total power of the signals sent to the transmitting antenna 104. The actual distance between the transmitting antenna 104 and the receiving antenna 106 may therefore vary, but would be fixed in any particular application. In any application, coupling should be kept below −40 dB. Below −40 dB, coupling can be filtered through adaptive leakage cancelling.

Figure 3:
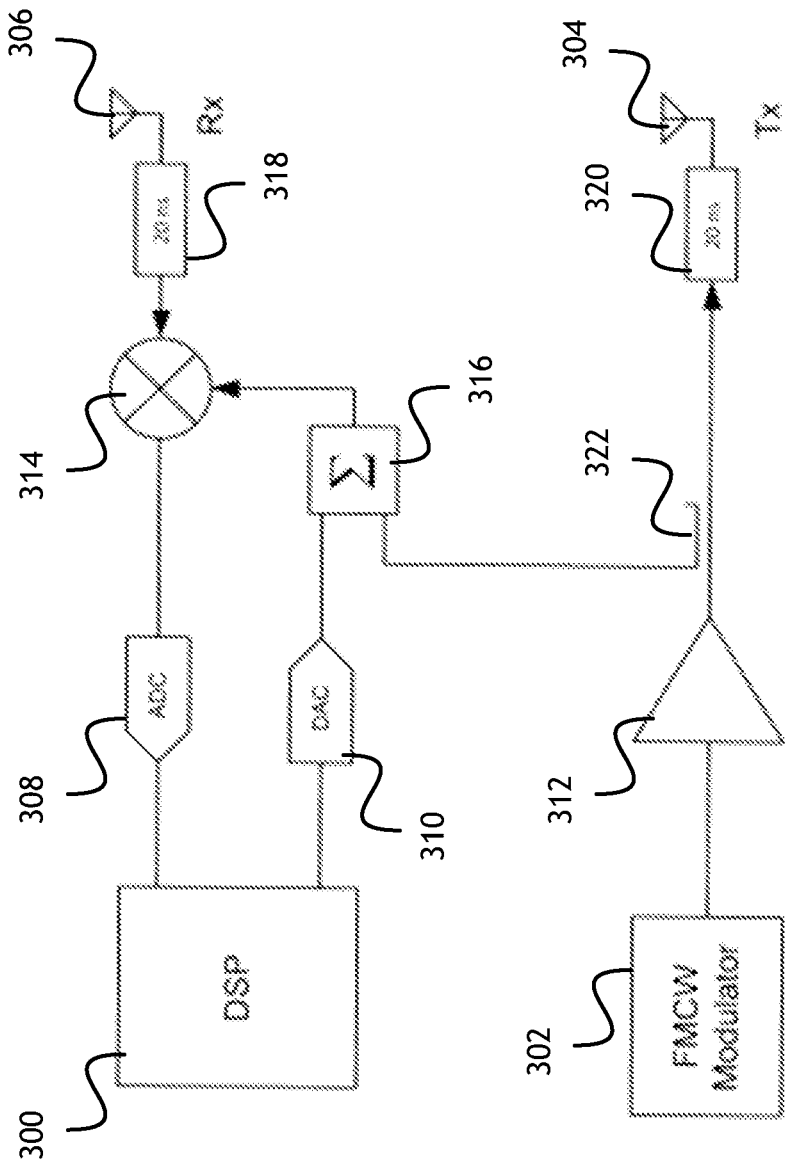
FIG. 3 shows a radio altimeter circuit block diagram according to at least one embodiment of the present invention.

Referring to FIG. 3, a radio altimeter circuit block diagram is shown. The circuit may include a processor 300 configured as a digital signal processor (DSP). The processor 300 may receive a signal from an analog to digital converter (ADC) 308 and send a signal to a digital to analog converter (DAC) 310. The FMCW modulator 302 may produce a modulated waveform having a linear triangular frequency-vs-time signal. The transmitter 312 may receive a signal from the modulator 302. The transmitter output may be sent to the transmitter antenna 304 through a delay line 320; power output at the transmitting antenna may be between 100 mW and 400 mW. A sample of the transmitter signal from coupler 322 may be connected to a summing amplifier 316. The summing amplifier 316 may also receive a signal from the DAC 310.

The summing amplifier 316 may produce an output signal representing the sum of the FMCW signal and a low-frequency signal from coupler 322 and the DAC 310. The output from the summing amplifier 316 may be received by a RF mixer 314. The RF mixer 314 may also receive a signal from a receiving antenna 306 through a delay line 318. The output from the RF mixer 314 may be received by the ADC 308, and the output of the ADC 308 may be sent to the processor 300.

Provided that coupling between the transmitting antenna 304 and the receiving antenna 306 remains below −40 dB, the processor 300 may be configured to filter out any aberrant effects of coupling. A radio altimeter according to the present invention may be contained in single unit, easily installed in an aircraft, as opposed to prior art radio altimeters that required more than 32 inches of separation between the transmitting antenna and any receiving antennae.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A radio altimeter apparatus comprising:
   a processor comprising:
      a digital signal processor;
      an analog-to-digital converter connected to the digital signal processor;
      a radio frequency mixer connected to the analog-to-digital converter;
      a digital-to-analog converter connected to the digital signal processor;
      a summing amplifier connected to the digital-to-analog converter and the radio frequency mixer; and
      a signal coupler connected to the summing amplifier, configured to receive a signal from a transmitting antenna through coupling;
   a transmitting antenna connected to the processor;
   a 20 ns delay element interposed between the transmitting antenna and the signal coupler;
   a receiving antenna connected to the radio frequency mixer, the transmitting antenna and receiving antenna oriented to be co-linear in an H-Plane;
   a 20 ns delay element interposed between the receiving antenna and the radio frequency mixer; and
   an antennae housing containing the transmitting antenna and receiving antenna, the antennae housing comprising an antennae divider interposed between the transmitting antenna and receiving antenna,
   wherein:
      the antennae divider has a trapezoidal cross-section in a plane defined by a line from the center of the transmitting antenna to the center of the receiving antenna, the line oriented along the H-Plane of the transmitting antenna and receiving antenna, and a line substantially perpendicular to the operative surface of the receiving antenna, a long parallel side of the trapezoidal cross-section proximal to the transmitting antenna and receiving antenna, and a short parallel side of the trapezoidal cross-section distal to the transmitting antenna and receiving antenna;
      the antenna housing is open to the environment on at least one side, such side defined by a ray extending perpendicularly from the transmitting antenna in a direction of desired operation, and having walls generally sloping away from the corresponding transmitting antenna and receiving antenna; and
      the processor is configured to transmit a signal through the transmit antenna, receive a corresponding reflected signal through the receiving antenna and derive an altitude based on the transmitted signal and received signal.

2. The apparatus of claim 1, wherein the antennae divider is configured to reflect signals from the transmitting antenna away from the receiving antenna.

3. The apparatus of claim 1, wherein the antennae divider comprises a radio-opaque material, wherein the antennae divider comprises a geometry configured to reflect signals originating from the transmitting antenna away from the receiving antenna.

4. The apparatus of claim 1, wherein the antenna housing is configured to reduce coupling between the transmitting antenna and receiving antenna to below −40 dB during normal operation.

5. The apparatus of claim 1, wherein the transmitting antenna and receiving antenna are no more than 32 inches apart.

6. A radio altimeter apparatus comprising:
a processor comprising:
- a digital signal processor;
- an analog-to-digital converter connected to the digital signal processor;
- a radio frequency mixer connected to the analog-to-digital converter;
- a digital-to-analog converter connected to the digital signal processor;
- a summing amplifier connected to the digital-to-analog converter and the radio frequency mixer; and
- a signal coupler connected to the summing amplifier, configured to receive a signal from a transmitting antenna through coupling;

a transmitting antenna connected to the processor, wherein the transmitting antenna comprises a phased array;
a 20 ns delay element interposed between the transmitting antenna and the signal coupler;
a receiving antenna connected to the radio frequency mixer, wherein the receiving antenna comprises a phased array, the transmitting antenna and receiving antenna oriented to be co-linear in an H-Plane;
a 20 ns delay element interposed between the receiving antenna and the radio frequency mixer;
a FMCW modulator connected to the transmitting antenna; and
an antennae housing containing the transmitting antenna and receiving antenna, the antennae housing comprising an antennae divider interposed between the transmitting antenna and receiving antenna,
wherein:
the antennae divider has a trapezoidal cross-section in a plane defined by a line from the center of the transmitting antenna to the center of the receiving antenna, the line oriented along the H-Plane of the transmitting antenna and receiving antenna, and a line substantially perpendicular to the operative surface of the receiving antenna, a long parallel side of the trapezoidal cross-section proximal to the transmitting antenna and receiving antenna, and a short parallel side of the trapezoidal cross-section distal to the transmitting antenna and receiving antenna;
the antenna housing is open to the environment on at least one side, such side defined by a ray extending perpendicularly from the transmitting antenna in a direction of desired operation, and having walls generally sloping away from the corresponding transmitting antenna and receiving antenna; and
the processor is configured to transmit a signal through the transmit antenna, receive a corresponding reflected signal through the receiving antenna and derive an altitude based on the transmitted signal and received signal.

7. The apparatus of claim 6, wherein:
the transmitting antenna comprises a plurality of phased array elements configured to produce a directional signal in a specific phase; and
the receiving antenna comprises a plurality of phased array elements configured to receive a signal in a specific phase.

8. The apparatus of claim 7, wherein plurality of phased array elements in the receiving antenna are further configured to minimize reception of ancillary signals from the transmitting antenna.

9. The apparatus of claim 8, wherein the transmitting antenna and receiving antenna are configured to reduce coupling between the transmitting antenna and receiving antenna to below −40 dB during normal operation.

10. The apparatus of claim 6, wherein the antennae divider is configured to reflect signals from the transmitting antenna away from the receiving antenna.

11. The apparatus of claim 10, wherein the antennae divider comprises a radio-opaque material, wherein the antennae divider comprises a geometry configured to reflect signals originating from the transmitting antenna away from the receiving antenna.

12. The apparatus of claim 6, wherein the antenna housing is configured to reduce coupling between the transmitting antenna and receiving antenna to below −40 dB during normal operation.

13. The apparatus of claim 7, wherein the transmitting antenna and receiving antenna are no more than 32 inches apart.

14. A radio altimeter apparatus comprising:
a processor comprising:
- a digital signal processor;
- an analog-to-digital converter connected to the digital signal processor;
- a radio frequency mixer connected to the analog-to-digital converter;
- a digital-to-analog converter connected to the digital signal processor;
- a summing amplifier connected to the digital-to-analog converter and the radio frequency mixer; and
- a signal coupler connected to the summing amplifier, configured to receive a signal from a transmitting antenna through coupling;

a transmitting antenna connected to the processor, wherein the transmitting antenna comprises a phased array configured to produce a directional signal in a specific phase;
a 20 ns delay element interposed between the transmitting antenna and the signal coupler;
a receiving antenna connected to the radio frequency mixer, wherein the receiving antenna comprises a phased array configured to receive a signal in a specific phase, the transmitting antenna and receiving antenna oriented to be co-linear in an H-Plane;
a 20 ns delay element interposed between the receiving antenna and the radio frequency mixer;
a FMCW modulator connected to the transmitting antenna; and
an antennae housing containing the transmitting antenna and receiving antenna and comprising at least an antennae divider interposed between the transmitting antenna and the receiving antenna, the antenna housing installed in an aircraft fuselage proximal to a landing surface,
wherein:
the antennae divider has a trapezoidal cross-section in a plane defined by a line from the center of the transmitting antenna to the center of the receiving antenna, the line oriented along the H-Plane of the transmitting antennae and receiving antennae, and a line substantially perpendicular to the operative surface of the receiving antenna, a long parallel side of the trapezoidal cross-section proximal to the transmitting antenna and receiving antenna, and a short parallel side of the trapezoidal cross-section distal to the transmitting antenna and receiving antenna;
the antenna housing is open to the environment on at least one side, such side defined by a ray extending perpendicularly from the transmitting antenna in a direction of desired operation, and having walls generally sloping away from the corresponding transmitting antenna and receiving antenna;

the processor is configured to transmit a signal through the transmit antenna, receive a corresponding reflected signal through the receiving antenna and derive an altitude based on the transmitted signal and received signal; and the processor is configured to recognize data attributable to coupling between the transmitting antenna and the receiving antenna when such coupling is less than −40 dB.

15. The apparatus of claim 14, wherein the processor is further configured to filter out coupling through adaptive leakage cancellation.

16. The apparatus of claim 14, wherein the transmitting antenna and receiving antenna are no more than 32 inches apart.

* * * * *